Jan. 1, 1963 E. W. TURNER 3,071,408
LIGHT INTERCEPTOR FOR VISORS
Filed June 3, 1960 3 Sheets-Sheet 1
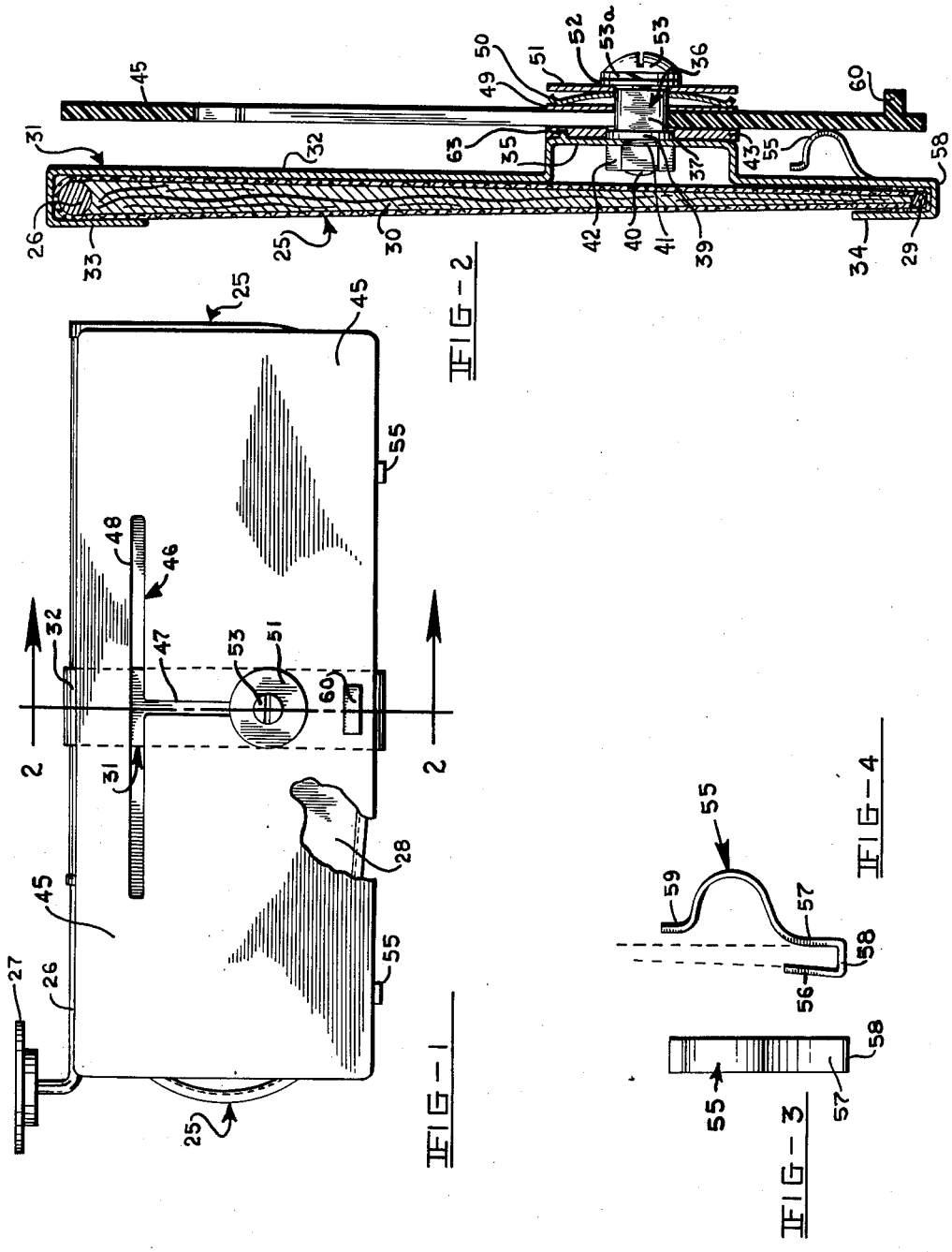
INVENTOR
EARL W. TURNER
BY Herbert A. Weintraub
ATTORNEY

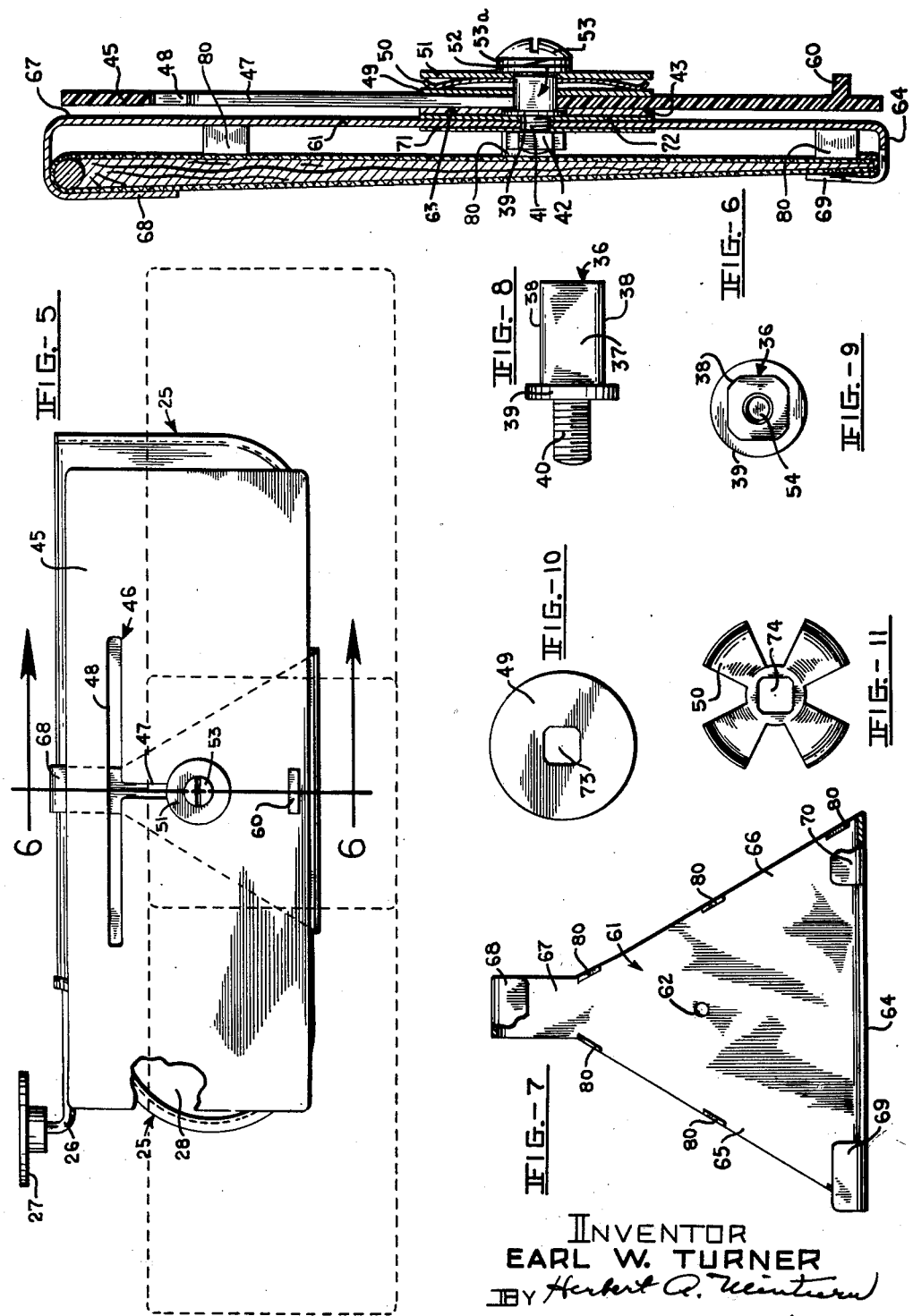

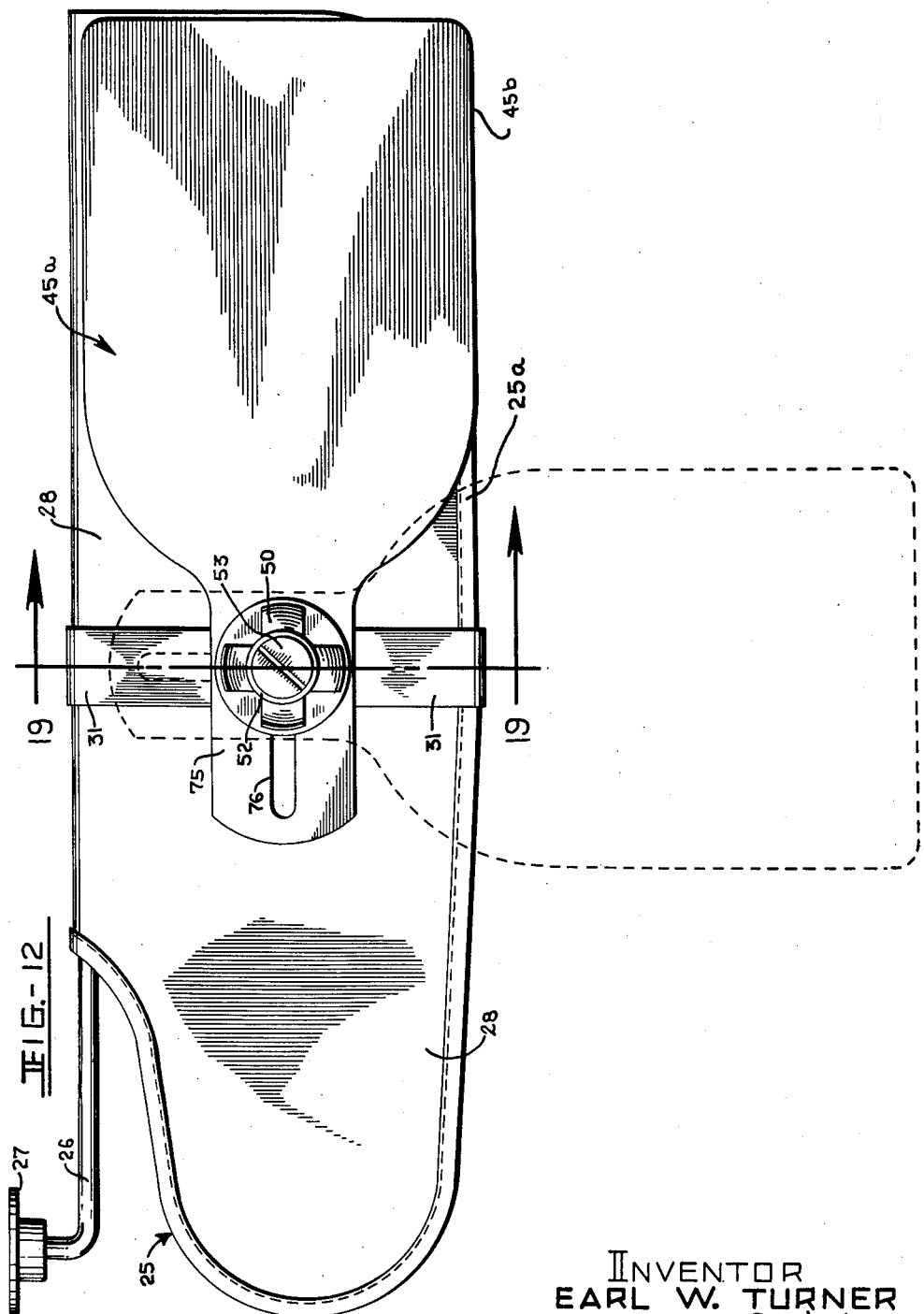

United States Patent Office 3,071,408
Patented Jan. 1, 1963

3,071,408
LIGHT INTERCEPTOR FOR VISORS
Earl W. Turner, 906 W. Superior St., Kokomo, Ind.
Filed June 3, 1960, Ser. No. 33,717
6 Claims. (Cl. 296—97)

This invention relates to a device which is particularly usable on automotive vehicles including airplanes and has for its primary purpose the provision of means which may be shifted in accordance with stationary or moving lights such as passing vehicles, or glare of the sunlight and the like, to intercept rays of light emanating from those sources in order to prevent "light" blindness in operation of the vehicle.

The invention may be mounted in different manners and positions such as on the usual and well known visors, or independently thereof, above or at the sides of the windshield.

The one particular form of the invention herein described and shown is illustrated as being mounted upon the normally employed visor which is opaque in itself in relation to transmission of light.

A primary object of the invention is to provide a device of the nature above indicated wherein there will be a light intercepting member which will permit the operator to see therethrough or which may be opaque, but in either event, the device will eliminate the glare or irritating and harmful effect of brilliant light beams. The device permits this interception of the light rays by means of a diffusing element which permits the operator to see through that element without distortion of his perception of the roadway and objects ahead and without color changes. In many parts of the country, such as in the southern states, the sun is exceedingly brilliant and often is reflected from concrete pavements directly into the operator's eyes. To prevent such reflections reaching the eyes of the operator in their full brilliance, the device of this invention constituting a diffusing element is employed to comfort the eyes as well as to permit wide open eye vision of the source of reflection or source of the light itself.

A further important object of the invention resides in the fact that it is adjustable to cover the full possible range of vision of the operator without leaving any gaps in the protection afforded his eyes beyond limits of the usual visor.

A still further important object of the invention is to provide such a device in an extremely simple mechanism which is readily and easily attached to the vehicle such as the normal sun visor; and which may be shifted to cover the field of vision without having to employ any tools or the like, the shifting being accomplished simply by rotating or shifting the diffusing element upwardly or downwardly or longitudinally.

These and many other objects and advantages of the invention will become apparent to those versed in the art in the following description of the invention as illustrated in the accompanying drawings, in which:

FIG. 1 is a view in rear elevation illustrating the device as attached to a sun visor;

FIG. 2 is a view in vertical section on the line 2—2 in FIG. 1 on an enlarged scale;

FIG. 3 is a view in rear elevation of a friction retaining member;

FIG. 4 is a view in side elevation of the friction retaining member;

FIG. 5 is a view similar to that shown in FIG. 1, but including a modified form of the mounting;

FIG. 6 is a view in vertical section on the line 6—6 in FIG. 5 on an enlarged scale;

FIG. 7 is a view in front elevation of a mounting element used in the structure of FIG. 5;

FIG. 8 is a post carried by either frame employed in the structures of FIG. 1 and FIG. 5;

FIG. 9 is a view in end elevation of the post of FIG. 8;

FIG. 10 is a view in elevation of a friction washer;

FIG. 11 is a view in elevation of a spring tensioning member; and

FIG. 12 is a view in rear elevation of a still further modified form of the invention.

Referring first to that form of the invention as illustrated in FIGS. 1–4, the usual visor 25 is shown as being mounted on a support rod 26 in turn swiveled in a bracket 27 attached generally to the ceiling of an automobile. This is the normal mounting of the visor 25. For the purposes of this invention, this visor 25 may be employed in its normal construction with an opaque central filling 28 supported by the rod 26 which may extend entirely around the margin of the visor 25. The lower part of the frame may be formed with a smaller rod 29 at the lower horizontal edge portion.

A frame generally designated by the numeral 31 consists of a strap preferably made out of metal and designated by the numeral 32 and has a vertical length sufficient to extend across the entire rear side of the visor 25, that is the side seen by the operator when the visor 25 is in its lowermost position. The ends of the strap 32 are bendable over the top and bottom of the visor to form tongues 33 and 34 respectively. The strap 32 is made sufficiently long so that where the visor 25 may vary in vertical height in this downward position, the tongues 33 and 34 may be bent around onto the opposite or front side of the visor, and where the visor is extremely short in this height, the ends of these tongues 33 and 34 of course may be cut off.

Spaced upwardly from the lower edge of the visor along the frame 31 there is an offset portion 35 which is spaced rearwardly from the visor 25, as indicated in FIG. 2, to provide a clearance between that portion 35 and the face of the visor 25.

A post generally designated by the numeral 36, FIGS. 2, 8 and 9, is formed to have a body 37 substantially square in cross-section but having the corners rounded off as indicated by the numeral 38, FIG. 9. These rounded corners 38 lie in a common circumferential surface the radius of which is on the central longitudinal line therethrough. This post 36 has a collar 39 therearound at one end of the rectangular portion, and continuing from that collar 39 is a threaded length 40 of smaller diameter than that of the rounded portion 38. The collar 39 is preferably circular and of a larger diameter than that of the rounded corners 38 of the post 36.

This post 36 is mounted on the offset strap portion 35 by being passed through a hole 41 provided therein to have the collar abut the portion 35 from the outer side and a self-locking nut 42 is screw-threadedly engaged with the portion 40 to abut the inner side of the portion 35 so as to fix the post 36 in position against movement therealong. A friction washer 43 is placed over the post 36 and has a central circular opening therethrough into which the collar 39 is received closely so that the washer 43 is in contact with the rear face of the length 35. The thickness of this washer 43 exceeds the thickness of the collar 39. A pin 63 integral with the portion 35 penetrates the washer 43 to hold the washer against rotation. An intercepting shield 45 consists of a substantially rectangular area of a plastic material which has been selected to have a gray tint. This plastic permits the operator to see therethrough and clearly define any object within his view, and at the same time prevents the brilliant rays of the sun from passing through that shield in such intensity that the operator would otherwise be blinded. Other colors of course can be used, but this particular tint seems to be most effective. As above indicated, the material may even be opaque.

This shield 45 has an opening therethrough to receive the rectangular portion of the post 36, and is so proportioned as to size of the opening that the shield may ride and rotate on the corners 38 of the post. As indicated in FIG. 1, this opening generally designated by the numeral 46 is T-shaped, having a vertical slot run 47 and a horizontal slot run 48. The width of both of these runs 47 and 48 is such that it exceeds only a "running" clearance around the corners of the post 36. The shield 45 is mounted on the post 36 to slide longitudinally therealong by having the post enter through either one of the runs 47 and 48, and then is retained thereon by means of an overlapping friction washer 49 with a square central hole 73 to confine movement longitudinally of the post; a cupped, fingered spring tensioning washer 50 also with a square central hole 74 confining the spring to longitudinal travel; a rigid washer 51 preferably with a square hole to confine it also to longitudinal travel; and a smaller diameter washer 52, and finally all of these elements are retained in position by means of a screw 53 carrying a lock washer 53a and screw-threaded into the end of the post 36 in a central bore 54, FIG. 9, provided therein.

By drawing up the screw 53, there being initially a clearance between the end of the post 36 and the washer 52, the spring washer 50 is tended to be flattened somewhat setting up a pressure between the washer 51 and the friction washer 49 which bears directly against the face of the shield 45. This tension is made to be such that it will normally hold the shield 45 in any position as it may be moved along the post 36 within the range of the vertical slot 47 and the range of the slot 48 with which the slot 47 intersects. That is, the shield 45 may be shifted up and down vertically, may be rotated about the post 36 in any position of shifting up and down; or in any position of the shield which may be either to the left or to the right of the post 36 when the shield is lowered to permit that shifting about and along the post 36.

Thus, the shield 45 may be lifted vertically or lowered vertically, may be shifted horizontally either to the left or to the right, and may be rotated in any one of the innumerable positions thus had by that shifting. In order to support the shield 45, to avoid such vibration as may arise when the vehicle is traveling, it is desired that one or more contact clips generally designated by the numeral 55 to be employed. Two in number of these clips would be sufficient. Each clip has a lower spring clamp portion comprised of a free finger 56 joined to an opposite opposing member 57 by a U-bend 58. From the opposing member the clip 55 curves around into approximately a semi-circular form and continues on from that form back into an upturned leg 59. The clip 55 in each instance, is engaged over the bottom edge of the visor 25 by having the lower clamp portioln brought up thereunder to have the tongue 56 on one side and the opposing member 57 on the other side so that a snug engagement is had with the visor. The portion 55 extends upwardly therefrom and between the visor 25 and the shield 45 as best indicated in FIG. 2. Preferably the clip 55 in each instance is rubber coated so that it will not scratch the shield 45, and will provide a highly frictional surface which is normally in contact with the shield 45, being somewhat compressible toward the visor 25 by reason of the finger 59 not normally being in contact with the visor 25. In any position of the shield 45, there will be a clip 55 bearing against the shield 45 so as to "steady" it and dampen out any vibrations otherwise possibly being set up, and to resist unwanted shifting of the shield on the post 36.

In employing the structure so far described, the shield 45 may be adjusted in respect to the post 36 as above indicated, by shifting the shield 45 to extend beyond either end of the normal visor 25, this shifting horizontally being particularly of advantage when there is sunshine, and the sun is at such an angle in respect to its rays impinging the operator's eyes that the rays of the sun would come around either end of the visor 25. In the early morning, or toward evening, sun rays often come under the normal visor 25, and then to overcome that, the shield 45 may be pulled downwardly and turned to any desired angle so as to intercept the rays. For convenience the shield 45 may be provided with a relatively small finger pull 60 in order to permit the operator to readily move the shield 45 without having to grasp it by his entire hand or the like.

In the modified form as shown in FIGS. 5–7, the same mounting structure of the shield 45 is employed in respect to the post 36. However the frame for carrying the post 36 is modified as indicated in FIG. 7, wherein there is a triangular-shaped body 61 having a hole 62 therethrough. At the upper end of the body 61, the sides 65 and 66 merge into a strap 67 which has a tongue 68 extending therefrom bendable over the top of the visor 25. The lower edge 64 has a pair of upturned tongues 69 and 70 which fit up over and forwardly of the lower edge of the visor 25 as best indicated in FIG. 6.

The form of the device shown in FIGS. 1 and 2, is provided with a frictional holding device primarily effective to a high degree to retain the shield 45 in desired shifted positions relative to the post 36 as to bodily linear travel of the shield. However, when the shield may be shifted primarily horizontally, the extension of the shield from the post 36 sets up an increasing leverage requiring a second tensioning mechanism to prevent rotative slippage, particularly if the clips 55 are not used.

This second tensioning device requires that the width of the slots 47 and 48 be reduced to have their opposing margins riding on the flat or "square" surfaces 37 of the post 36 whereby rotative turning of the shield will also rotate the post 36. In this case, there will be a hardened metal washer 71 placed between the nut 42 and the front side of the frame 61 as in FIG. 6, and a second hardened metal washer 72 between the post collar 39 and the back side of the frame 61 with the threaded post portion 40 passing through both of those washers 71 and 72, with the forward side of the collar bearing on the washer 72 and the nut 42 bearing against the washer 71.

By adjusting the nut 42, varying degrees of friction resisting rotative travel of the shield 45 are had. Thus a greater resistance to shield rotation than to sliding action across the post may be had. It is preferred that this be the result of use of the two tensioning devices.

The frame 61 is shown as having a planar surface. Spacers 80 are turned forwardly from the edges 65 and 66 to space the frame 61 from the visor 25 to provide clearance for the nut 42 and the friction washer 71.

There is shown in FIG. 12, a modified shape of the shield, being designated in FIG. 12 by the numeral 45a, wherein the shield may be termed as "paddle" shaped with a neck 75. The frame 31 as above described in reference to FIGS. 1 and 2, may be employed along with the clips 55 with this shield form. The shield 45a is mounted on the post 36 in the same manner as is the shield 45 in the structure described in reference to FIG. 6.

There is a slot 76 extending longitudinally of the neck 75. This slot 76 has its opposing side edges slidably fitting along two opposite flat faces 37 of the post 36. Sliding the shield 45a across this post 36 is resisted by the tension of the spring 50. Also rotative movement of the shield 45a is resisted to some extent by this same spring 50, but the major resistance to rotative travel is resisted by the friction on the frame 31 through the washers 71 and 72 induced by pressure of the nut 42.

In this form of FIG. 12 the shield 45a may be shifted horizontally within the length of the slot 76, rotated with bolt 36, dropped down vertically as indicated by the dash lines, and from that position raised and lowered within the limits of the length of the slot 76, and may be located in any other intermediate position. This form of course is somewhat cheaper to build and may be sold at a lower price than the forms of FIGS. 1 and 2.

Therefore it is to be seen that I have provided a very effective mounting for a diffusing shield or what is popularly termed an anti-glare shield. It may be shifted to any one of the possibly desired positions to intercept light rays coming directly toward a vehicle operator's eyes. While I have shown my invention in the various forms illustrated and described herein, I do not desire to be limited to those precise forms, particularly to having the device mounted solely on a now commonly used visor, particularly in view of the fact that various modifications may be employed without departing from the spirit of the invention, and I do not desire to be limited to these precise forms beyond the limitations which may be imposed by the following claims.

I claim:

1. The combination with an opaque, planar visor normally mounted to be rocked about an axis from an approximately horizontal position to an approximate vertical position and to be swung horizontally with the axis moving in an approximately horizontal plane, of an anti-glare device carried by said visor in a multiplicity of positions extending in part beyond the boundary of said visor, said device comprising a mounting frame having a vertical height exceeding that of said visor and tongues extending from the frame bendable around the top and bottom edges of said visor variably positioning the frame along said visor; a post fixed to and extending rearwardly from said frame, intermediate said visor top and bottom edges; a friction washer carried by said post fixed against rotation therearound; an anti-glare, transparent shield having a slot therethrough; said post extending through the slot; said shield bearing by slot edge portions against said washer; a second friction washer carried by said post shiftable longitudinally of the post, fixed against rotation therearound, and bearing against the rear face of said shield about the edge portions of said slot; a flexible member axially shiftable on said post; and means carried by the post flexing said member and compressibly urging it against said second washer, in turn urging said shield against the first washer setting up frictional resistance to rotation and linear shifting of said shield; said shield being radially shiftable about and from said bolt selectively providing extension of a portion of said shield beyond an edge of said opaque visor.

2. The structure of claim 1 in which the length of said slot and the location of said frame on said visor is that wherein the slot is always covered by said visor.

3. The structure of claim 1 in which said frame is generally triangular in shape with its base along a lower edge of said visor.

4. The structure of claim 1 in which said shield is generally paddle-shaped with an extending neck portion; and said slot extends along and through said neck portion.

5. An anti-glare device comprising a mounting frame; a post axially rotatively carried by the frame; one frictional means yieldingly resisting axial post rotation; an anti-glare shield having a slot receiving a portion of said post therethrough; means preventing rotation of the shield about said post while permitting travel longitudinally of the post and laterally therefrom within the limit of the slot; a second friction means carried by the post independently of said one friction means frictionally resisting lateral travel of said shield from the post; whereby said one friction may be variably set up to control rotation of the post and hence the shield, and said second friction may be also variably set up to control extension of the shield laterally of the post.

6. An anti-glare device comprising a mounting frame; a post rotatively extending by one end portion through said frame, and having a pair of parallel flat faces; a collar on the post at which said faces terminate; a washer under said collar on said post and contacting one of said frame faces; a nut screw-threadedly engaging said post portion drawing said collar against said washer and providing variable frictional resistance to rotation of the post relative to said frame; an anti-glare planar shield having a linear longitudinal slot extending therethrough for a distance; a friction washer about said collar and between said shield and said frame; said slot having a width to receive said post by a second portion therethrough extending from said collar and with said post faces being in sliding contact with the opposite side of the slot to have the second portion extend by a free end beyond the shield; a friction washer fitting on said post second portion against the shield and having a central opening with marginal edges slidingly engaging said post faces; a spring member slidingly fitting on said post second portion by an opening, the edges of which slidingly engage said post faces and bearing against said last friction washer; and screw means engaging said post second portion exerting pressure on said spring member, in turn on said last friction washer, and thereby gripping said shield between said friction washer frictionally resisting travel of the shield laterally across said post.

References Cited in the file of this patent
UNITED STATES PATENTS

| | | |
|---|---|---|
| 1,409,340 | Hanna | Mar. 14, 1922 |
| 2,184,360 | Nichols | Dec. 26, 1939 |
| 2,220,429 | Soderberg | Nov. 5, 1940 |
| 2,235,421 | Devine | Mar. 18, 1941 |
| 2,603,530 | Jones | July 15, 1952 |
| 2,755,126 | Ludlow | July 17, 1956 |
| 2,824,763 | Extrom | Feb. 25, 1958 |
| 2,915,937 | Winchell | Dec. 8, 1959 |